(12) United States Patent
Sipilä

(10) Patent No.: US 11,686,613 B2
(45) Date of Patent: Jun. 27, 2023

(54) ULTRAVIOLET FLAME DETECTOR

(71) Applicant: Fenno-Aurum Oy, Espoo (FI)

(72) Inventor: Heikki Johannes Sipilä, Espoo (FI)

(73) Assignee: FENNO-AURUM OY, Espoo (FI)

( * ) Notice: Subject to any disclaimer, the term of this patent is extended or adjusted under 35 U.S.C. 154(b) by 75 days.

(21) Appl. No.: 17/501,268

(22) Filed: Oct. 14, 2021

(65) Prior Publication Data

US 2022/0128401 A1 Apr. 28, 2022

(30) Foreign Application Priority Data

Oct. 22, 2020 (FI) ..................................... 20206044

(51) Int. Cl.
| | |
|---|---|
| *G01J 1/42* | (2006.01) |
| *G01J 1/04* | (2006.01) |
| *H01J 40/06* | (2006.01) |
| *H01J 40/10* | (2006.01) |
| *H01J 40/16* | (2006.01) |

(52) U.S. Cl.
CPC .............. *G01J 1/429* (2013.01); *G01J 1/0488* (2013.01); *H01J 40/06* (2013.01); *H01J 40/10* (2013.01); *H01J 40/16* (2013.01)

(58) Field of Classification Search
CPC .......... G01J 1/429; G01J 1/0488; H01J 40/06; H01J 40/10; H01J 40/16; H01J 47/02; H01J 47/06; H01J 47/08; G08B 17/12; G01T 7/125
See application file for complete search history.

(56) References Cited

U.S. PATENT DOCUMENTS

| | | | |
|---|---|---|---|
| 2,507,359 A | 5/1950 | Weisz | |
| 3,656,019 A | 4/1972 | Stowe | |
| 4,614,871 A * | 9/1986 | Driscoll | G01N 30/74 |
| | | | 313/542 |
| 2002/0089283 A1 | 7/2002 | Francke et al. | |
| 2007/0029191 A1* | 2/2007 | Sewell | C23F 13/18 |
| | | | 204/297.01 |

(Continued)

FOREIGN PATENT DOCUMENTS

| | | | | |
|---|---|---|---|---|
| FI | 52637 B | 6/1977 | | |
| FI | 129757 | * 8/2022 | | G01T 7/12 |

(Continued)

OTHER PUBLICATIONS

European Search Report for EP Application No. 21204212 dated Feb. 22, 2022 (2 pages).

(Continued)

*Primary Examiner* — David P Porta
*Assistant Examiner* — Gisselle M Gutierrez
(74) *Attorney, Agent, or Firm* — Merchant & Gould P.C.

(57) ABSTRACT

An ultraviolet flame detector (100) includes a housing (102) having an opening (103) at a first end (101a) of the housing (102), and a window structure (104) arranged to cover the opening (103) of the housing (102). A photocathode (106) is arranged to a second end (101b) of the housing (102) so that the photocathode (106) is facing inside the housing (102). An anode wire (108) is arranged between the window structure (104) and the photocathode (106). The anode wire (108) is configured to travel transversally across the housing (102). The ultraviolet flame detector (102) is filled with a gas.

13 Claims, 2 Drawing Sheets

SECTION A-A

(56) References Cited

U.S. PATENT DOCUMENTS

2008/0258619 A1\* 10/2008 Bascle .................... H01J 43/18
                                                            313/533

FOREIGN PATENT DOCUMENTS

JP          S52113275 A  \*  9/1977   .............. H01J 47/06
WO          02/097757 A1    12/2002

OTHER PUBLICATIONS

Abbrescia et al., "Systematic Studies and Optimization of Super Sensitivity Gaseous Detectors of Sparks, Open Flames and Smoke," Arxiv. Org, 2020, XP081621831 (24 pages).
Finnish Search Report for FI Application No. 20206044 dated Jun. 4, 2021 (1 page).

\* cited by examiner

ULTRAVIOLET FLAME DETECTOR

CROSS-REFERENCE TO RELATED APPLICATION

This application claims benefit of Finnish Application No. 20206044, filed 22 Oct. 2020, and which application is incorporated herein by reference. To the extent appropriate, a claim of priority is made to the above-disclosed application.

TECHNICAL FIELD

The invention concerns in general the technical field of detectors. Especially the invention concerns flame detectors.

BACKGROUND

Typically, ultraviolet (UV) sensitive detectors may be used to detect flames or sparks. The detectors may typically be used for detecting the flames in indoor spaces, e.g., buildings, or outdoor spaces. Typically, the flames are emitting UV radiation at a wavelength band between 185 and 280 nanometers. For example, lamps used for lighting, do not emit UV radiation at said wavelength band due to a strong UV absorption in their materials, such as glass. This enables that the UV radiation from the flames may be detected by means of the flame detectors in indoor spaces. Moreover, because the ozone layer in the atmosphere absorbs the UV radiation from the sun at said wavelength band, the UV radiation from the flames may also be detected by means of the flame detectors outdoor spaces (e.g. forest fires, etc.).

For example, the flame detectors may be implemented as proportional counters comprising a cylindrical shaped photocathode tube and an anode wire travelling substantially along the longitudinal axis of the photocathode tube, which may be filled by a gas.

In order to be able to detect the flame as far away as possible, the flame detector should be sensitive to the UV wavelength band radiation and as insensitive as possible for radiation at longer wavelengths which dominates daylight light. The sensitivity of the flame detector may typically be limited by a background radiation caused by the daylight and pulses caused by the cosmic radiation.

Thus, there is a need for developing solutions in order to improve at least partly sensitivity of the flame detectors.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an ultraviolet flame detector. Another objective of the invention is to provide the ultraviolet flame detector with an improved sensitivity.

The objectives of the invention are reached by an ultraviolet flame detector as defined by the respective independent claim.

According to a first aspect, an ultraviolet flame detector is provided, wherein the ultraviolet flame detector comprises: a housing having an opening at a first end of the housing, a window structure arranged to cover the opening of the housing, a photocathode arranged to a second end of the housing so that the photocathode is facing inside the housing, and an anode wire arranged between the window structure and the photocathode, wherein the anode wire is configured to travel transversally across the housing, and wherein the ultraviolet flame detector is filled with a gas.

The gas may be a mixture of the following gases: argon (Ar), isobutane ($iC_4H_{10}$), and hydrogen gas ($H_2$).

Alternatively or in addition, the material of the photocathode may be cesium iodide (CsI) or any other solar blind material.

Alternatively or in addition, the inner surfaces of the housing may be coated with a metal having a work function of at least 5 eV.

The metal coating may be gold, wherein the work function of the gold may be from 5.1 to 5.3 eV.

Alternatively or in addition, the ultraviolet flame detector may further comprise a wire mesh arranged under the window structure and configured to protect one or more components of the flame detector from electromagnetic interferences.

The wires of the wire mesh may be coated with a metal having a work function of at least 5 eV, wherein the metal coating may be gold.

Alternatively or in addition, the housing may comprise two opposing through holes arranged to a longitudinal side wall of the housing for the anode wire.

Alternatively or in addition, the anode wire may be arranged at a predetermined distance (D) from the photocathode.

Alternatively or in addition, the material of the window structure may be one of fused silica, sapphire, calcium fluoride, or magnesium fluoride.

Alternatively or in addition, the window structure may comprise an interference filter.

Alternatively or in addition, the anode wire may be configured to be positively biased, wherein a preamplifier may be electrically connected to the anode wire via a coupling capacitor.

Alternatively, the photocathode may be configured to be negatively biased, wherein a preamplifier may be electrically connected directly to the anode wire.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1A:
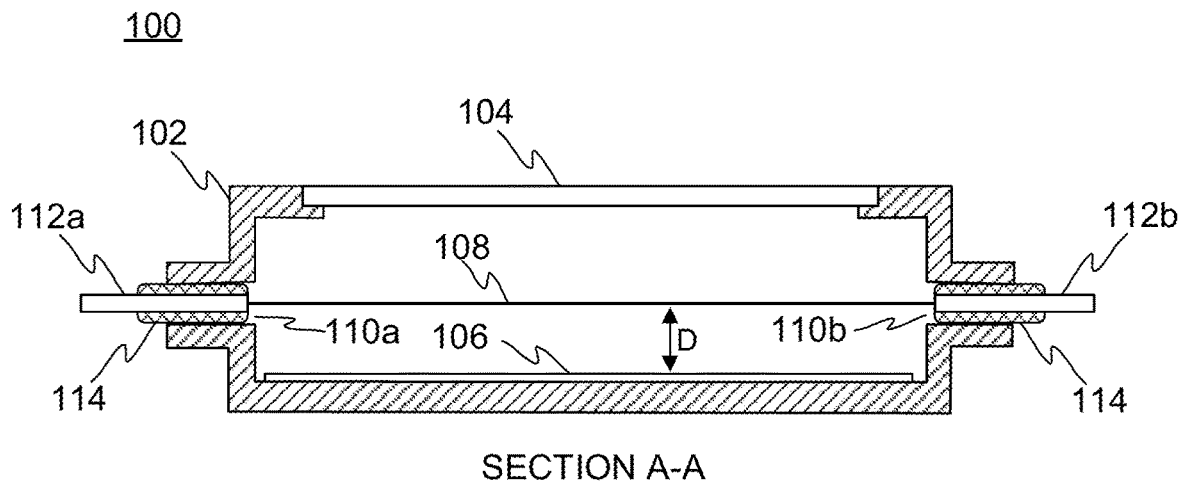
FIGS. 1A and 1B illustrate schematically an example of an UV flame detector according to the invention.
Figure 1B:
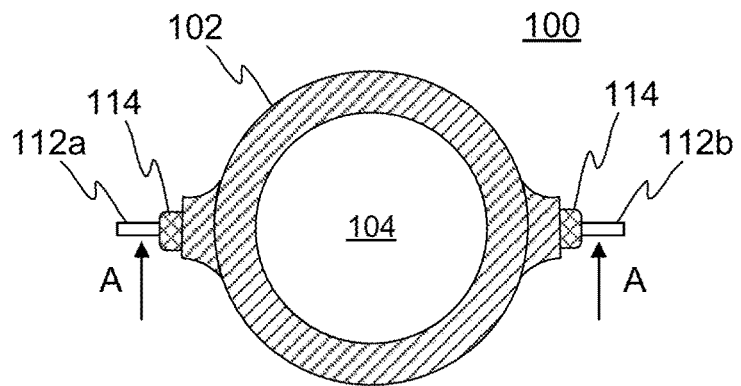
Figure 1C:
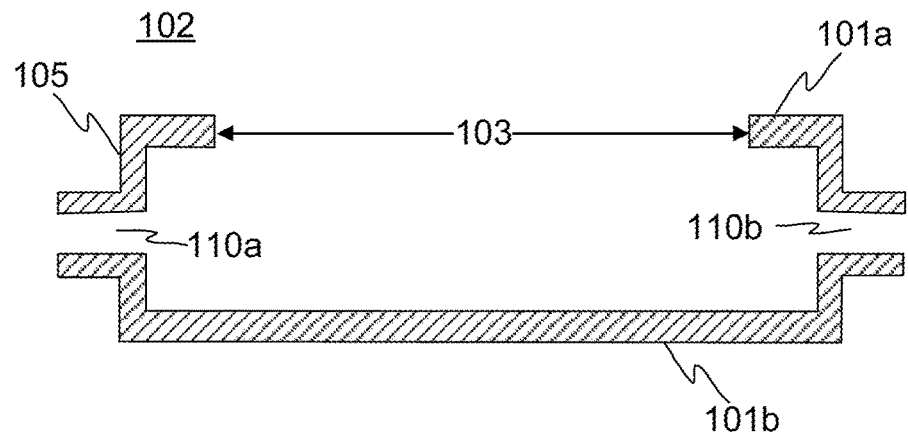
FIG. 1C illustrates an example of a housing of an UV flame detector according to the invention.

FIG. 1A illustrates schematically an example of an ultra-violet (UV) flame detector, i.e. a solar blind UV detector, 100 according to the invention. FIG. 1A illustrates a cross section of the UV flame detector 100. FIG. 1B illustrates schematically a top view of the UV flame detector 100 of FIG. 1A. The flame detector 100 comprises a housing 102, a window structure 104, a photocathode 106, and an anode wire 108 arranged between the window structure 104 and the photocathode 106. The housing 102 may be substantially cylindrical. Especially inner surfaces of the housing 102 may form a substantially cylindrical chamber inside the housing 102. The housing 102 has first end 101a, e.g. a top end of the housing 102, and a second end 101b, e.g. a bottom end of the housing 102. The housing 102 has an opening 103 at the first end 101a of the housing 102. FIG. 1C illustrates an example of the housing 102 of the UV flame detector 100 according to the invention. FIG. 1C illustrates a cross section of the housing 102. The window structure 104 is arranged to cover the opening 103 of the housing 102. In other words, the window structure 104 is attached to the housing 102 at a region around the opening 103 of the housing 102. The photocathode 106 is arranged to the second end 101b of the housing 102 so that the photocathode 106 is facing inside the housing 102. The anode wire 108 is configured to travel substantially transversally across the housing 102, i.e. in a direction substantially perpendicular to a longitudinal axis of the housing 102. The UV flame detector 100 is filled with a gas.

The UV flame detector 100 according to the invention may be used for detecting flames or sparks. Although, hereinafter throughout the application the detection of the flames is discussed, all the same applies also for the detection of the sparks. Typically, the flames are emitting UV radiation, i.e. UV light, at a wavelength band between 185 and 280 nanometers. The UV flame detector 100 according to the invention 100 is sensitive to UV radiation at a solar blind UV wavelength band, i.e. UV wavelengths below 300 nanometers. The UV flame detector 100 according to the invention 100 is especially sensitive to the UV radiation emitted by the flames. The UV flame detector 100 according to the invention is capable to detect the flames indoors and/or outdoors. The operation of the UV flame detector 100 according to the invention may be implemented as a gas-filled proportional counter configured to detect the flames. The UV radiation emitted by the flames penetrates through, i.e. passes through, the window structure 104 and reaches the photocathode 106. The anode wire 108 is biased in relation to the photocathode 106 to create an electric field inside the UV flame detector 100. Because of the created electric field, photoelectrons detaching from the photocathode 106 drift towards the anode wire 108 and positive ions drift from the anode wire 108 towards the photocathode 106. Near the anode wire 108 the electric field is high, i.e. the strength of the electric field is large, causing amplification of a signal via a gas amplification. The signal may be induced to a preamplifier 202 (for sake of clarity not shown in FIGS. 1A-1C) electrically connected to the anode wire 108, when positive ions drift from the anode wire 108 to the photocathode 106. The gas amplification must be higher than 2000 to resolve it from background noise of the electronics of the UV flame detector 100 and lower than 20000 so that the gas amplification stays in the proportional mode and not reach a Geiger mode, where amplitude information will be lost. In the Geiger mode the gas amplification saturates causing that a signal induced by a single photoelectron cannot be distinguished from a signal induced by background radiation, e.g. a cosmic background radiation caused by thousand(s) of electrons. When the gas amplification is in the proportional mode, i.e. in a linear mode, the signal induced by the single photoelectron may be distinguished from the signal induced by the cosmic background radiation.

A diameter of the cylindrical housing 102 may be e.g. from 40 to 60 millimeters. Preferably, the diameter of the cylindrical housing 102 may be e.g. from 45 to 55 millimeters. The opening 103 of the housing 102, which is covered by the window structure 104, may have a diameter smaller than or equal to the diameter of the housing 102. In the example illustrated in FIGS. 1A-1C the diameter of the opening 103 of the housing 102 is smaller than the diameter of the housing 102, but the invention is not limited to this. The diameter of the radiation window 104 may be depend on the diameter of the opening 103 of the housing 102 and thus also on the diameter of the housing 102. Thus, also the diameter of the window structure 104 may be smaller than or equal to the diameter of the housing 102. The diameter of the window structure 104 may preferably be as large as possible. The diameter of the window structure 104 may be e.g. from 35 to 60 millimeters depending on the diameter of the opening 103 of the housing 102 and/or the diameter of the housing 102. According to a non-limiting example, the diameter of the housing 102 may be 48 millimeters and the diameter of the window structure 104 may be 45 millimeters.

According to an example embodiment of the invention, the inner surfaces of the housing 102 may be coated with a metal having a work function of at least 5 eV. This eliminates or at least reduces background radiation caused by daylight penetrated through, i.e. passed through, the window structure 104 and hit to the inner surfaces of the housing 102, e.g. the longitudinal side wall of the housing 102. Before the daylight hits to the inner surfaces of the housing 102, it may have been scattered from the photocathode 106. Preferably, the metal coating may be gold. The work function of the gold may be from 5.1 to 5.3 eV. The material of the housing 102 itself may be for example, but is no limited to, stainless steel.

The material of the window structure 104 may be selected so that the window structure 104 is transparent to the UV radiation, especially UV radiation at the wavelength band between 185 and 280 nanometers, to enable the UV radiation emitted by the flames to enter inside the detector 100 and to reach the photocathode 106. The material of the window structure 104 may be e.g. one of fused silica, sapphire, calcium fluoride, or magnesium fluoride. The mentioned materials enable that the window structure 104 is transparent to the UV radiation emitted by the flames.

Alternatively or in addition, the material of the photocathode 106 may be selected so that the photocathode 106 is sensitive to the UV radiation emitted by the flames, i.e. the UV radiation at the wavelength band between 185 and 280 nanometers. The material of the photocathode 106 may be e.g. cesium iodide (CsI) or any other solar blind material. These materials enable that the photocathode 106 is sensitive to the UV radiation emitted by the flames. The photocathode 106 may be implemented as a coating on a surface of the second end 101$b$ of the housing 102 facing inside the housing 102 as illustrated in the example of FIG. 1A. Alternatively, the photocathode 106 may form the second end 101$b$ of the housing 102, i.e. the bottom end of the housing 102. In other words, the second end 101$b$ of the housing 102 may itself act as the photocathode 106.

According to an example embodiment of the invention, the gas with which the UV flame detector 100 is filled may be a gas mixture of argon (Ar), isobutane ($iC_4H_{10}$), and hydrogen gas ($H_2$), i.e. the gas mixture of $Ar+iC_4H_{10}+H_2$. Preferably, the UV flame detector 100 may be filled with the gas mixture of $Ar+(4-8\%)iC_4H_{10}+(1-3\%)H_2$. Alternatively, the gas may be e.g. a gas mixture of argon (Ar) and carbon dioxide ($CO_2$) or any other suitable gas. By filling the UV flame detector 100 with the gas mixture of $Ar+iC_4H_{10}+H_2$ enables that the UV flame detector 100 expires more slowly, i.e. a lifetime of the UV flame detector 100 filled with the gas mixture of $Ar+iC_4H_{10}+H_2$ may be over an order of magnitude longer than a lifetime of the UV flame detector 100 filled e.g. with the gas mixture of $Ar+iC_4H_{10}$ without $H_2$. Moreover, the gas mixture of $Ar+iC_4H_{10}+H_2$ is radiation-resistant and enables substantially low high voltage (HV) for the gas amplification. The mixture of $Ar+iC_4H_{10}$ is so called Penning mixture. In the gas amplification process the argon atom either ionizes or excites. The ionization energy of the isobutane is lower than the excitation energy of the argon. Thus, the excited argon atoms ionize the isobutane (so called Penning process). Because of this more powerful ionization process, the needed HV for the gas amplification may be substantially low, i.e. lower in comparison to other gas mixtures, e.g. with the gas mixture of $Ar+CO_2$ higher HV is needed.

Figure 2A:
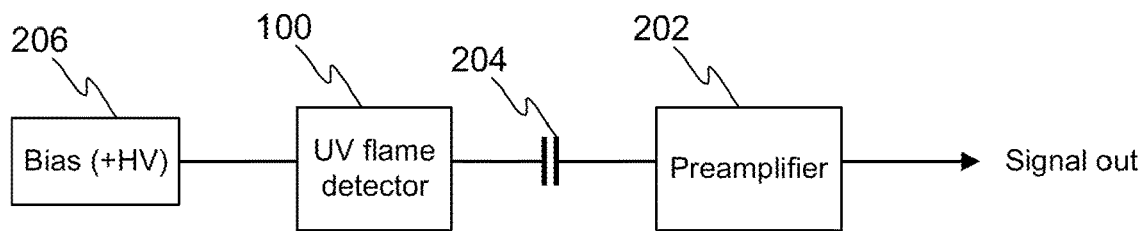
FIG. 2A illustrates schematically a simple example of biasing an UV flame detector according to invention.
Figure 2B:
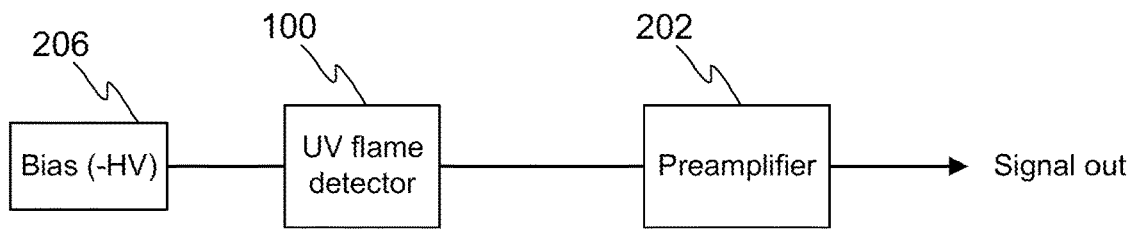
FIG. 2B illustrates schematically another simple example of biasing an UV flame detector according to invention.

The material of the anode wire 108 may be e.g. tungsten, i.e. wolfram. Tungsten itself is a strong material. The anode wire 108 may be coated with a metal having a work function of at least 5 eV, e.g. gold. The coating of the anode wire 108 enables that the surface of the anode wire 108 maintains stable and does not react with the gas. The anode wire 108 may be arranged at a predetermined distance D from the photocathode 106 as illustrated in FIG. 1A. The housing 102 may comprise two opposing through holes 110$a$, 110$b$ arranged to the longitudinal side wall 105 of the housing 102 for the anode wire 108, i.e. for providing the anode wire 108 inside the housing 102 to enable the anode wire 108 travel transversally across the housing 102 at the predetermined distance D from the photocathode 106. A first end of the anode wire 108 may pass through one of the two through holes, e.g. a first through hole 110$a$, and a second end of the anode wire 108 may pass through the other one of the two through holes, e.g. a second through hole 110$b$. An insulating material, e.g. ceramic material, 114 may be arranged inside the two through holes 110$a$, 110$b$ for insulation of the anode wire 108 from the housing 102. Alternatively or in addition, a pin 112$a$, 112$b$ may be arranged to each end of the anode wire 108, i.e. a first pin 112$a$ may be arranged to the first end of the anode wire 108 and a second pin 112$b$ may be arranged to the second end of the anode wire 108. The pins 112$a$, 112$b$ may be arranged at least partially inside the through holes 110$a$, 110$b$ as illustrated in FIG. 1A, i.e. the first pin 112$a$ may be arranged at least partially inside the first through hole 110$a$ and the second pin 112$b$ may be arranged at least partially inside the second through hole 110$b$. The pins 112$a$, 112$n$ enable providing electrical connections to the anode wire 108, e.g. the electrical connection to the preamplifier 202 and/or the electrical connection for biasing the anode wire 108. The anode wire 108 may be positively biased, e.g. by means of a positive HV, wherein the preamplifier 202 may be electrically connected to the anode wire 108 via a coupling capacitor 204. FIG. 2A illustrates schematically a simple example of biasing the UV flame detector 100 according to invention, wherein the anode wire 108 is positively biased by a voltage source 206. Alternatively, the photocathode 106 may be biased negatively, e.g. by means of a negative HV. This enables that the preamplifier 202 may be electrically connected directly to the anode wire 108 without the coupling capacitor 204, which in turn reduces input capacitance and substantially also microphonism of the UV flame detector 100. FIG. 2B illustrates schematically another simple example of biasing the UV flame detector 100 according to invention, wherein the photocathode 106 is negatively biased by the voltage source 206. The longitudinal side wall 105 of the housing 102 may have a thickening at a location of the through holes 110$a$, 110$b$, i.e. the longitudinal side wall 105 of the housing 102 may be thicker at the location of the at the through holes 110$a$, 110$b$ than at the other parts of the longitudinal side wall 105 of the housing 102 as illustrated in the example of FIGS. 1A to 1C. This may improve mechanical robustness, i.e. mechanical strength, of the housing 102. Alternatively, the longitudinal side wall 105 of the housing 102 may have similar, i.e. consistent, thickness throughout the entire longitudinal side wall 105 of the housing 102.

Diameters of the through holes 110$a$, 110$b$ may have an effect on the electric field inside the housing 102 of the UV flame detector 100. Preferably, the diameters of the through holes 110$a$, 110$b$ may be defined so that the electric field in the longitudinal direction of the anode wire 108 is substantially constant, i.e. that substantially uniform electric field may be achieved over an entire surrounding area of the anode wire 108. The substantially constant electric filed in the longitudinal direction of the anode wire 108 enables that a photoelectron detaching from any part of the photocathode 106 may be at the same position with regard to the gas amplification, which in turn enables that the signal may be amplified at every point of the anode wire 108 so that the signal is above the noise of the electronics of the UV flame detector, e.g. the noise of the preamplifier 202. The diameters of the two through holes 110$a$, 110$b$ may be for example, but are not limited to, from 2 millimeters to 5 millimeters. Preferably, the diameters of the through holes 110$a$, 110$b$ may be e.g. 4 millimeters.

Alternatively or in addition, a ratio between the predetermined distance D and the diameter of the housing 102 may have an effect on the electric field inside the housing 102 of the UV flame detector 100. Preferably, the predetermined distance D may be defined so that the ratio between the predetermined distance D and the diameter of the housing 102 enables that the electric field in the longitudinal direction of the anode wire 108 is substantially constant.

Figure 3:
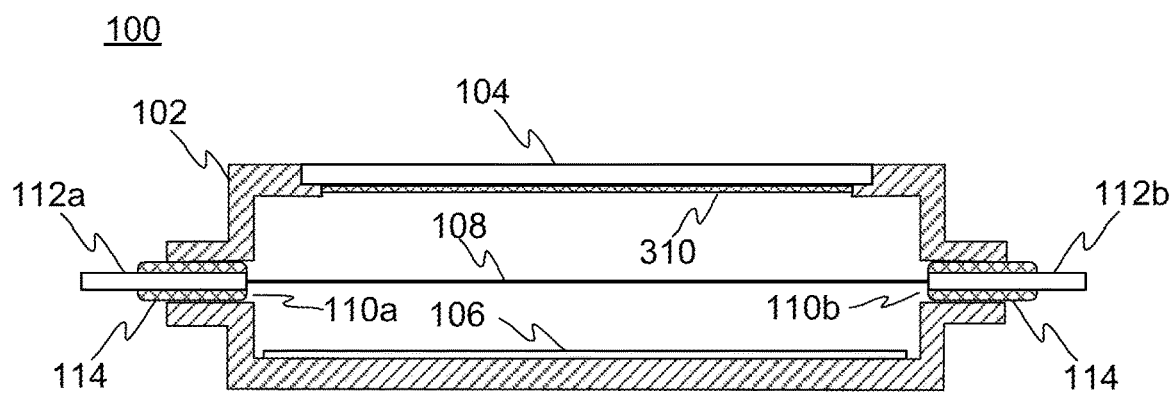
FIG. 3 illustrates schematically another example of an UV flame detector according to the invention.

According to an example embodiment of the invention, the UV flame detector 100 may alternatively or in addition comprise a wire mesh 310 arranged to the first end 101$a$ of the housing 102 under, i.e. below, the window structure 104. In other words, the wire mesh 310 may be arranged to the first end 101$a$ of the housing next to a lower surface of the window structure 104, i.e. the surface of the window structure 104 which is facing inside the housing 102. The wire mesh 310 may be arranged to the first end 101$a$ of the housing 102 under the window structure 104 so that a gap exists between the window structure 104 and the wire mesh 310, i.e. between the lower surface of the window structure 104 and the wire mesh 310. The gap between the window structure 104 and the wire mesh 310 may be for example, but is not limited to, less than 1 millimeter. Alternatively, the wire mesh 310 may be arranged to the first end 101a of the housing 102 under the window structure 104 so that the wire mesh 310 is substantially in contact with the window structure 104, i.e. with the lower surface of the window structure 104. FIG. 3 illustrates schematically an example of the UV flame detector 100 comprising the wire mesh 310. The wire mesh 310 may be configured to protect one or more components of the UV flame detector 310 from electromagnetic interferences. Especially, the wire mesh 310 may be configured to protect the preamplifier electrically connected to the anode wire 108 from the electromagnetic interferences by preventing the propagation of the electromagnetic interferences to the preamplifier 202. Moreover, the wire mesh 310 may prevent the window structure 104 to be charged and by this way the wire mesh 310 enables that the electric field inside the UV flame detector 100 may be kept stable. At the same time the wire mesh 310 allows the desired radiation, i.e. UV radiation emitted by the flames, to pass, i.e. penetrate, through the wire mesh 310 so that the desired radiation reaches the photocathode 106. The wire mesh 310 may preferably be substantially sparse, i.e. an area formed by openings of the wire mesh 310, i.e. openings between wires of the wire mesh 310, may be at least 95% of the area of the wire mesh 310. According to a non-limiting example of a sparce wire mesh 310 the diameter of the wires of the wire mesh 310 may be 25 micrometers and the openings of the wire mesh 310 may be 1 millimeter times 5 millimeters. The wire mesh 310 may be formed e.g. by a plurality of parallel wires. Alternatively, the wire mesh 310 may be formed e.g. a plurality of intersecting wires. The wires of the wire mesh 310 may be coated with a metal having a work function of at least 5 eV, e.g. with gold. The work function of the gold may be from 5.1 to 5.3 eV as discussed above. The coating of the wires of the wire mesh 310 eliminates or at least reduces the background radiation as discussed above.

Figure 4:
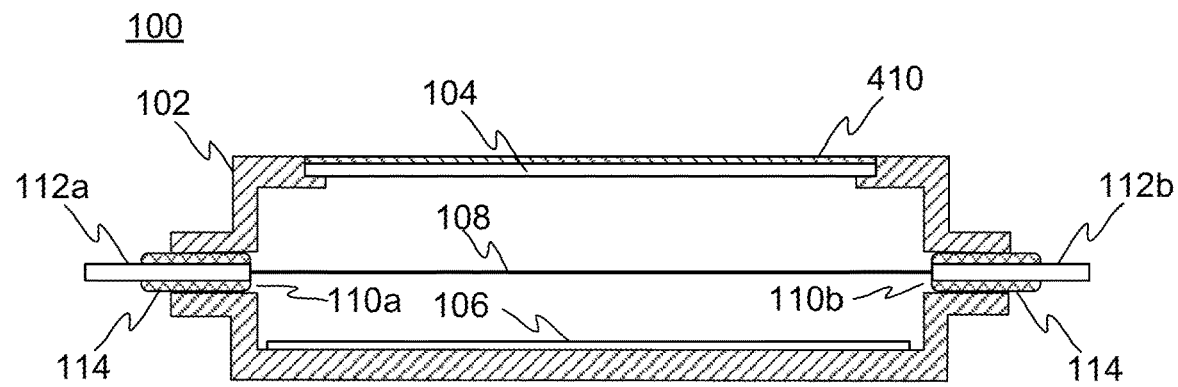
FIG. 4 illustrates schematically yet another example of an UV flame detector according to the invention.

Alternatively or in addition, according to an example embodiment of the invention, the window structure 104 may comprise an interference filter 410. In other words, the interference filter 410 may be integrated to the window structure 104. FIG. 4 illustrates schematically an example of the UV flame detector 100 comprising the interference filter 410. In the example of FIG. 4 the wire mesh 310 is not illustrated, but the UV flame detector 100 may also comprise both the wire mesh 310 and the interference filter 410. The interference filter 410 may be a multilayer interference filter that may be grown on top of the window structure 104 by using the window structure 104 as a substrate for the growing of the interference filter 410. The interference filter 410 may be grown on top of the window structure 104 e.g. by sputtering or by using thin film manufacturing techniques, e.g. atomic layer deposition (ALD). The window structure 100 may be attached to the housing 102 so that the interference filter 410 of the window structure 104 may be facing outwards from the UV flame detector 100 as illustrated in the example of FIG. 4. Alternatively, the window structure 104 may be attached to the housing 102 so that the interference filter 410 of the window structure 104 may be facing inside the UV flame detector 100, i.e. inside the housing 102. The integration of the interference filter 410 to the radiation window structure 104 enables that a separate interference filter is not needed to be used with the UV flame detector 100. In other words, the integrated interference filter 410 eliminates the need for a separate interference filter.

The illustrated dimensions in Figures are not to scale and not comparable to each other; they have been selected only for graphical clarity in the drawings.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An ultraviolet flame detector comprising:
a housing having an opening at a first end of the housing;
a window structure arranged to cover the opening of the housing;
a photocathode arranged to a second end of the housing so that the photocathode is facing inside the housing; and
an anode wire arranged between the window structure and the photocathode, wherein the anode wire is configured to travel transversally across the housing;
wherein the ultraviolet flame detector is filled with a gas.

2. The ultraviolet flame detector according to claim 1, wherein the gas is mixture of the following gases: argon (Ar), isobutane ($iC_4H_{10}$), and hydrogen gas ($H_2$).

3. The ultraviolet flame detector according to claim 1, wherein the photocathode comprises cesium iodide (CsI) or any other solar blind material.

4. The ultraviolet flame detector according to claim 1, wherein inner surfaces of the housing are coated with a metal having a work function of at least 5 eV.

5. The ultraviolet flame detector according to claim 4, wherein the metal coating is gold.

6. The ultraviolet flame detector according to claim 1, further comprising a wire mesh arranged under the window structure and configured to protect one or more components of the flame detector from electromagnetic interferences.

7. The ultraviolet flame detector according to claim 6, wherein wires of the wire mesh comprise a metal coating with a metal having a work function of at least 5 eV, wherein the metal coating is gold.

8. The ultraviolet flame detector according to claim 1, wherein the housing comprises two opposing through holes arranged to a longitudinal side wall of the housing for the anode wire.

9. The ultraviolet flame detector according to claim 1, wherein the anode wire is arranged at a predetermined distance from the photocathode.

10. The ultraviolet flame detector according to claim 1, wherein the window structure comprises one of fused silica, sapphire, calcium fluoride, or magnesium fluoride.

11. The ultraviolet flame detector according to claim 1, wherein the window structure comprises an interference filter.

12. The ultraviolet flame detector according to claim 1, wherein the anode wire is configured to be positively biased, and wherein a preamplifier is electrically connected to the anode wire via a coupling capacitor.

13. The ultraviolet flame detector according to claim 1, wherein the photocathode is configured to be negatively biased, and wherein a preamplifier is electrically connected directly to the anode wire.

* * * * *